June 27, 1950 — L. J. SCHILLER — 2,513,111
LOW GREEN CROP HARVESTING MACHINE
Filed Jan. 24, 1949 — 6 Sheets-Sheet 1
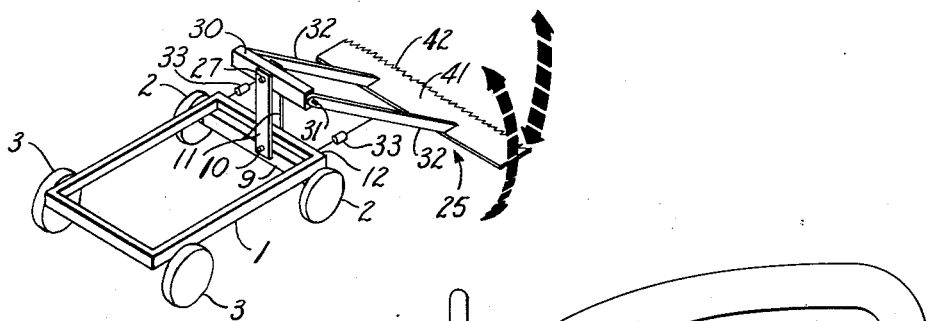
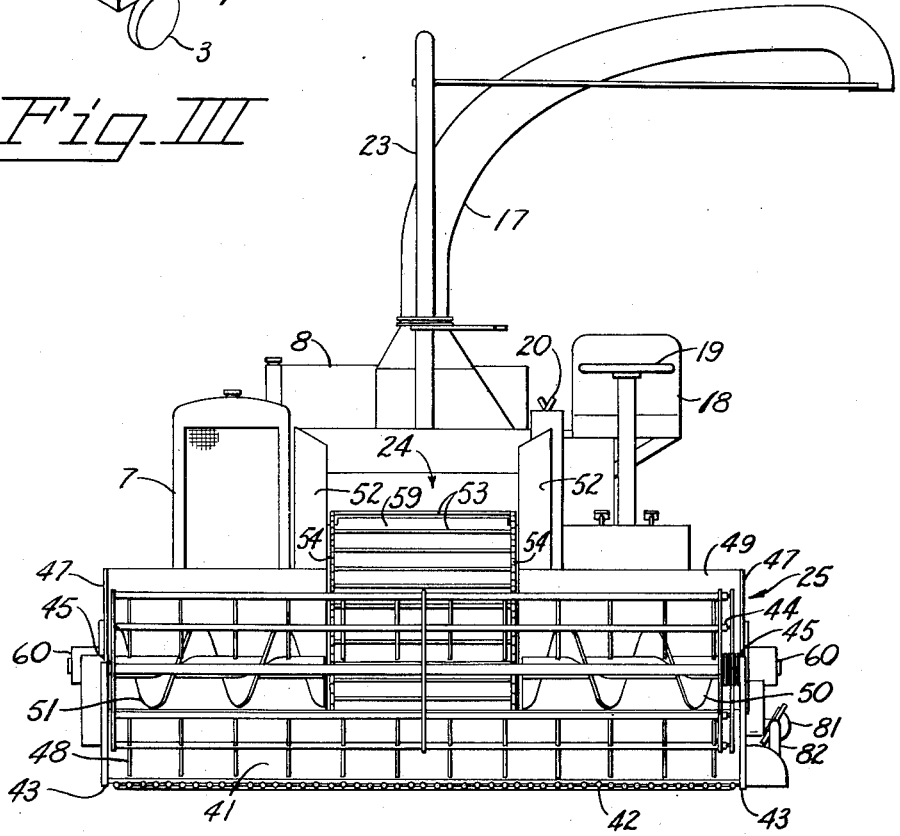
INVENTOR.
Lawrence J. Schiller
BY Marshall, Marshall & Leonard
ATTORNEYS June 27, 1950
L. J. SCHILLER
2,513,111
LOW GREEN CROP HARVESTING MACHINE
Filed Jan. 24, 1949
6 Sheets-Sheet 2
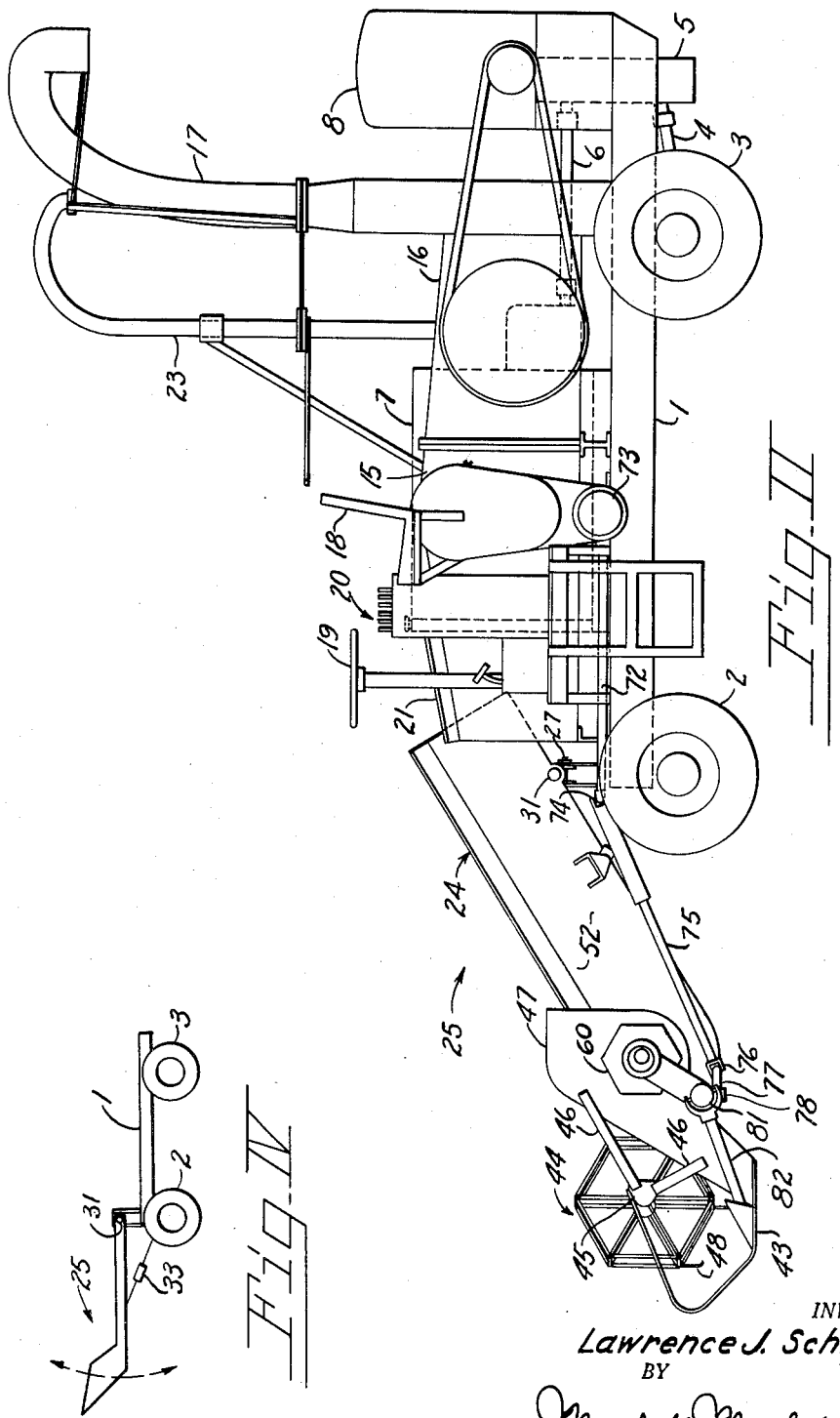
INVENTOR.
Lawrence J. Schiller
BY
Marshall, Marshall & Leonard
ATTORNEYS June 27, 1950  L. J. SCHILLER  2,513,111
LOW GREEN CROP HARVESTING MACHINE
Filed Jan. 24, 1949  6 Sheets-Sheet 3
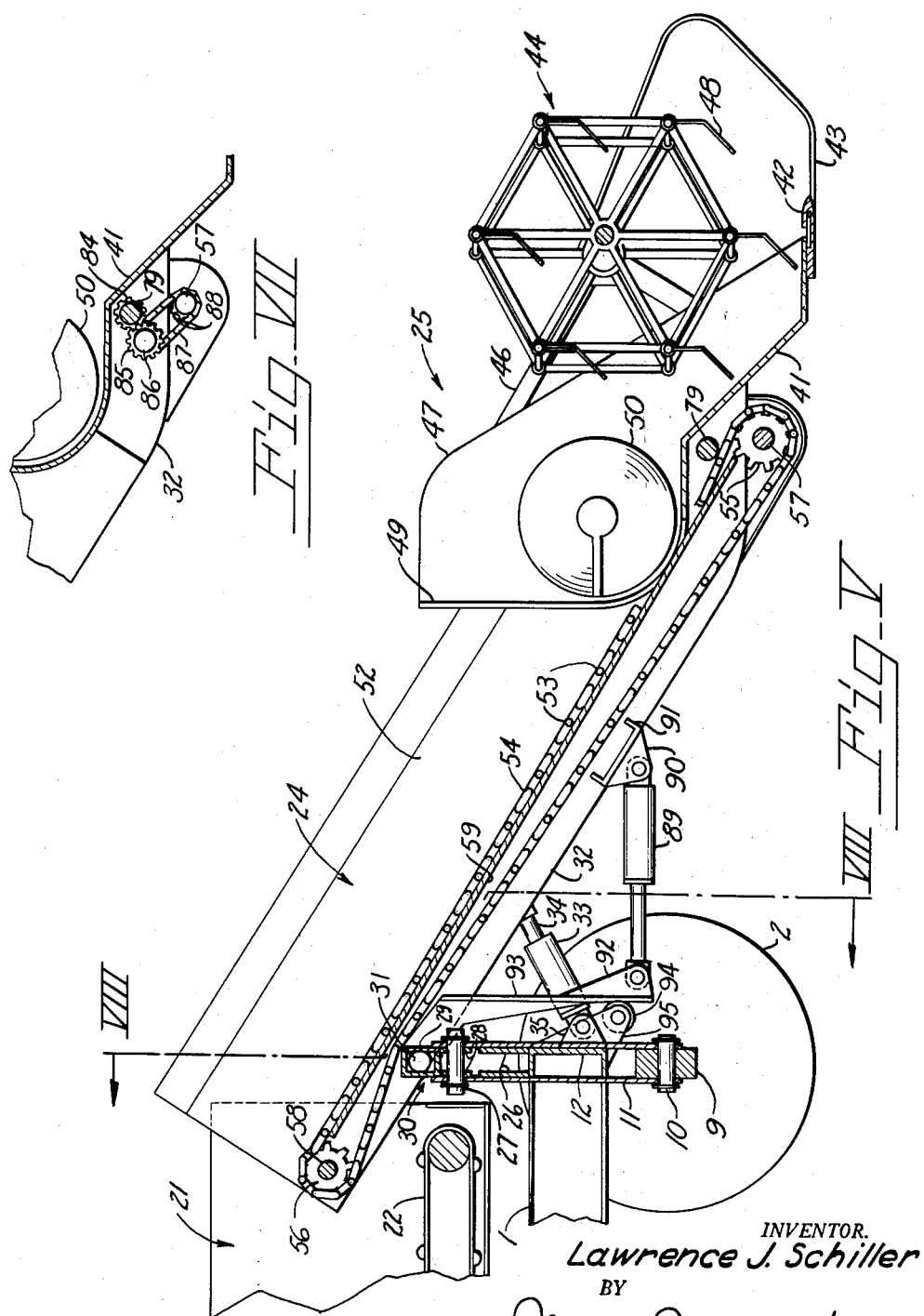
INVENTOR.
Lawrence J. Schiller
BY
Marshall, Marshall & Leonard
ATTORNEYS June 27, 1950
L. J. SCHILLER
2,513,111
LOW GREEN CROP HARVESTING MACHINE
Filed Jan. 24, 1949
6 Sheets-Sheet 4
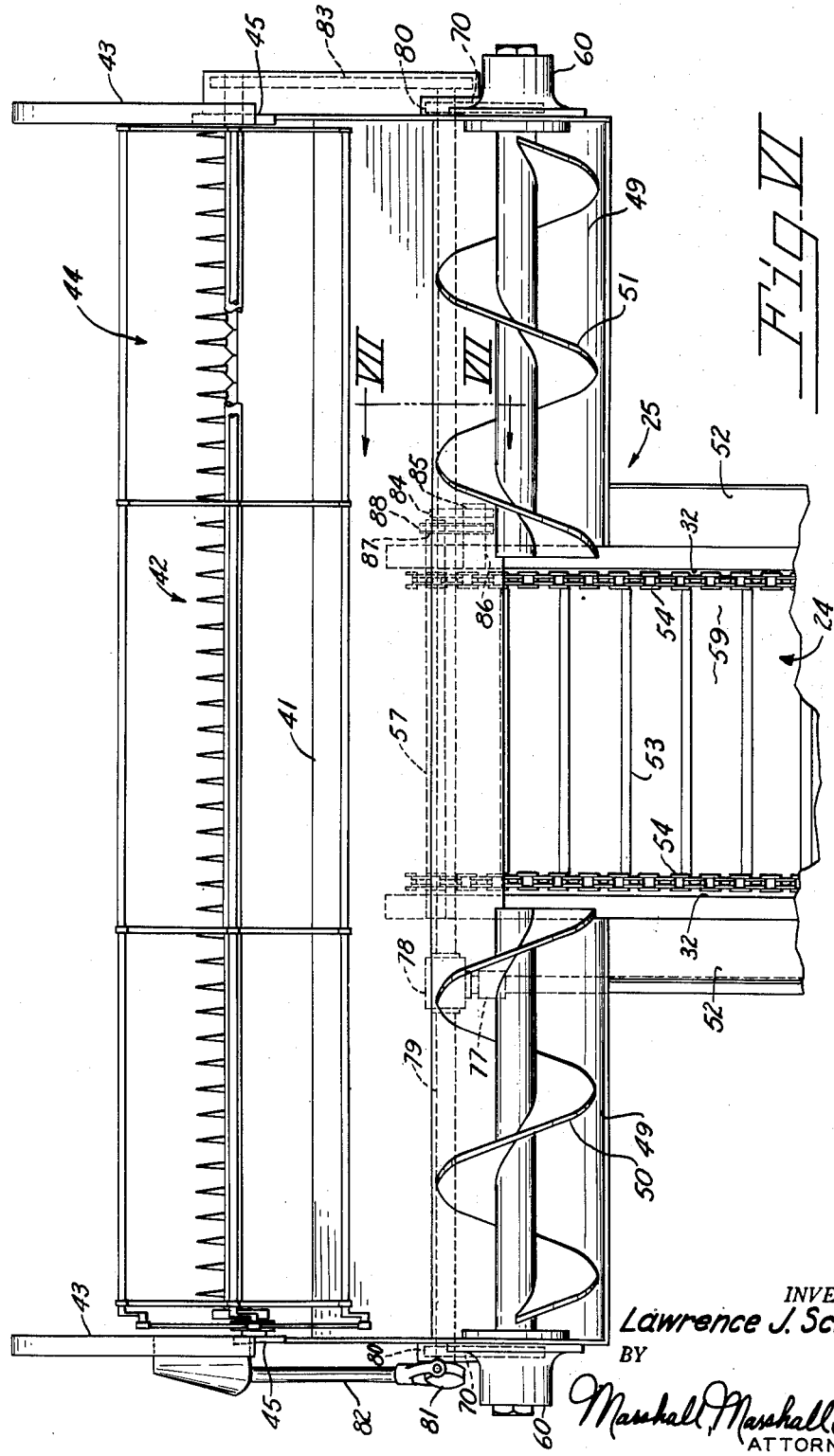
INVENTOR.
Lawrence J. Schiller
BY
Marshall, Marshall & Leonard
ATTORNEYS

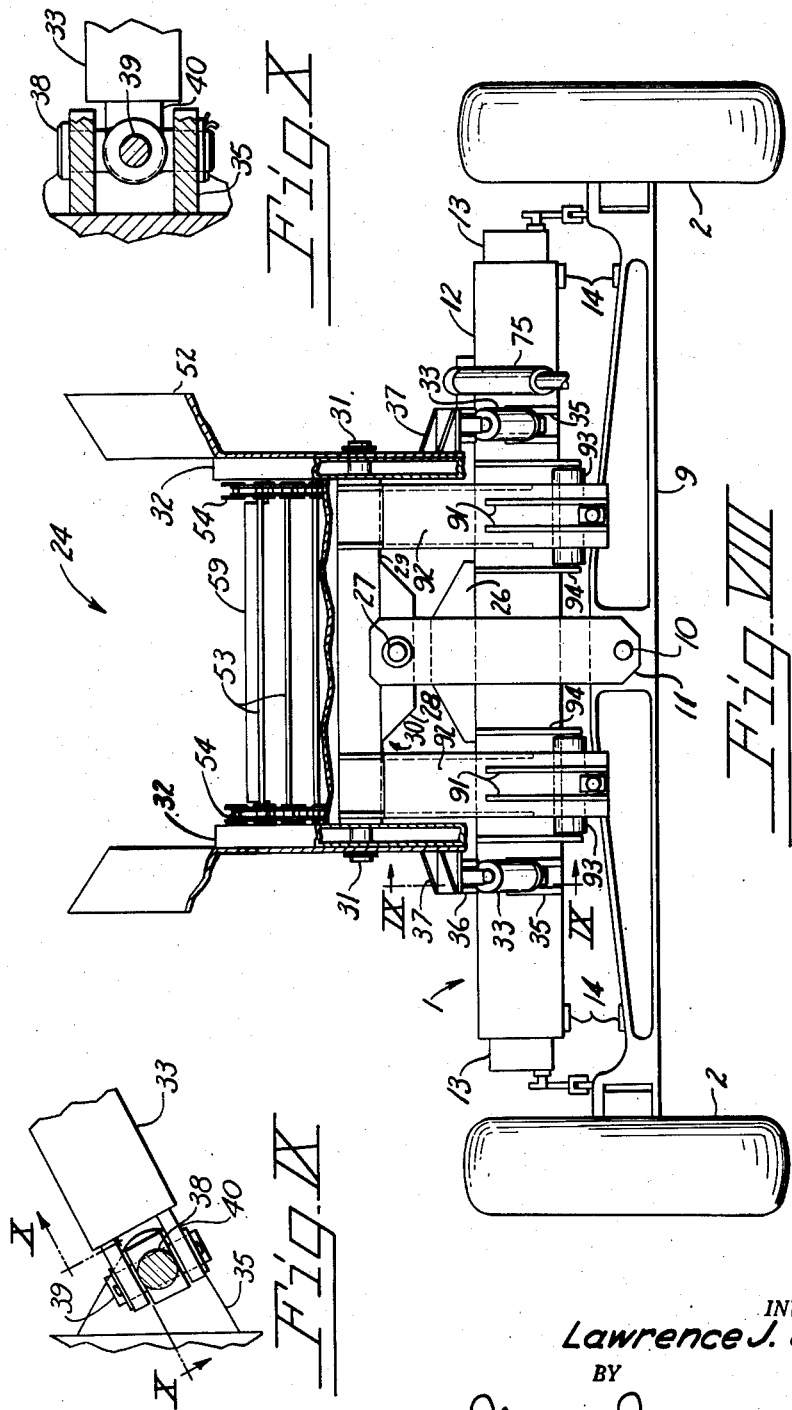

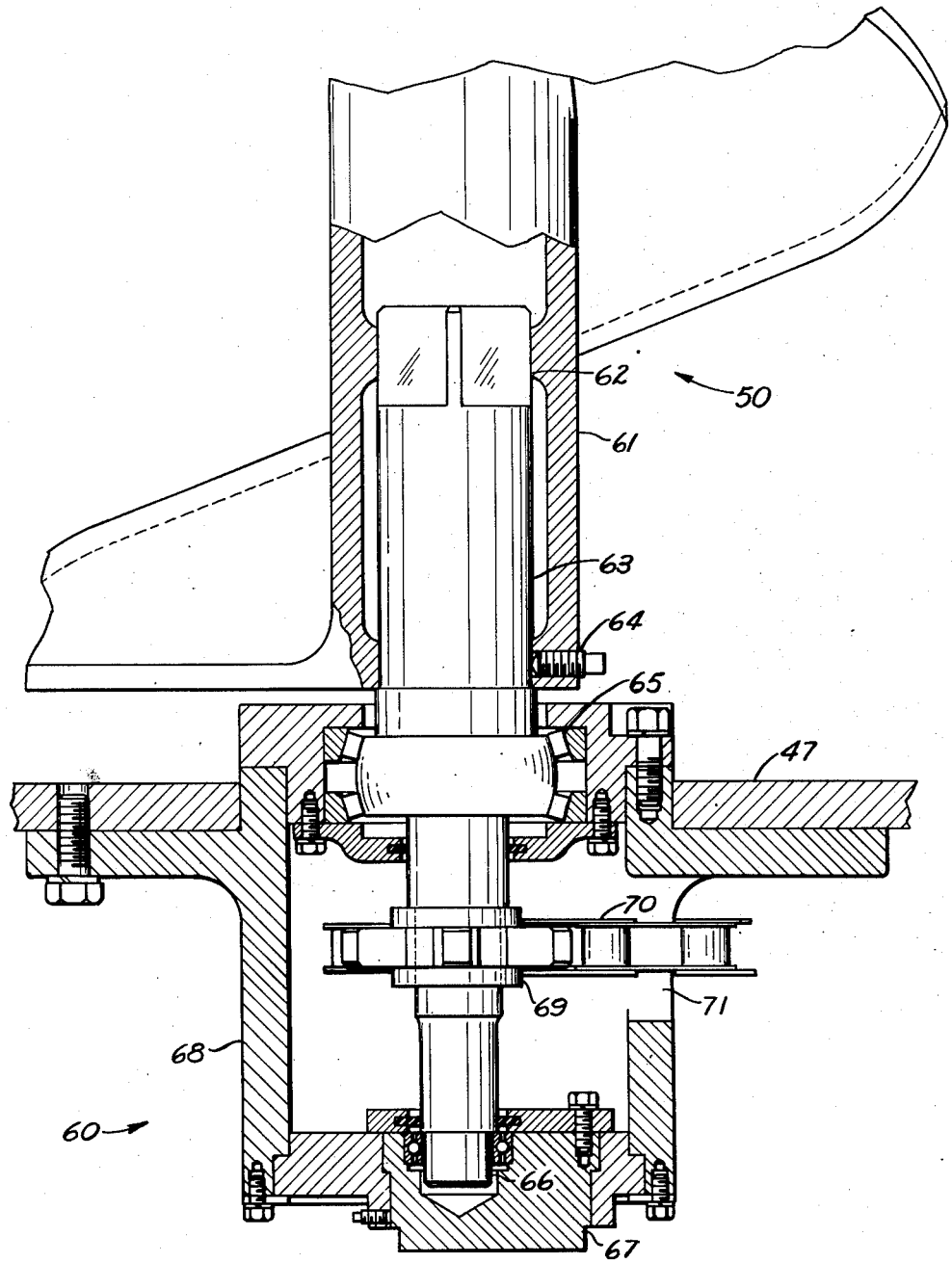
Fig XI

Patented June 27, 1950

2,513,111

UNITED STATES PATENT OFFICE 2,513,111

LOW GREEN CROP HARVESTING MACHINE

Lawrence J. Schiller, Oak Harbor, Ohio

Application January 24, 1949, Serial No. 72,396

6 Claims. (Cl. 56—23)

This invention relates to low crop harvesting machines and more particularly to a machine designed for the harvesting and treating of alfalfa and similar green crops.

Alfalfa is well known and widely used as a source of vitamin A in cattle feed. The hay itself however is bulky to handle and, therefore, a process for the reduction of the alfalfa to a more easily handled form has been developed and refined. This process usually consists in cutting the hay at its peak condition, chopping it into small lengths, immediately dehydrating the chopped hay and then grinding it into a meal which may be mixed with other feed components. Because the vitamin A content of the hay varies during growth and also if exposed to sun or excess moisture after cutting it is important that the hay be cut at exactly the right time and that it be dehydrated and processed as soon as possible thereafter.

In the past it has been the custom to mow the hay, rake it into windrows, pick it up with a so-called field chopper which runs down the windrows and, after chopping, transfer it by blower or other mechanism into wagons or trucks running along side the field chopper. This method of operation requires a number of different machines and the services of a considerable number of men.

One serious disadvantage which exists in harvesting machines which have been developed in the past resulted from their inability to follow the contour of the ground and the resulting uneven mowing of the hay. In grain crops such as wheat or oats the particular distance above the ground at which the stalks are cut is not of great importance. The heads are the valuable portion of the plant, the stalks merely serving as straw and, therefore, mowing machines which do not closely follow the contour of the ground can be successfully used in harvesting such crops since it does not matter if the stalks left behind are one inch high or 10 inches high. In the mowing of a hay crop however it is desirable that the crop should be clipped a uniform distance above the ground and that no hay should be wasted by cutting it with long stalks such results where a dip in the ground passes beneath the mower bar and the bar does not follow the contour of the ground to trim the hay closely and evenly at a substantially constant distance above the ground.

It is the principal object of this invention to provide a self-propelled combination harvesting machine for low green field crops, particularly hay, and, even more particularly, alfalfa.

It is another object of this invention to provide a combination mower and chopper for the preparation of alfalfa hay which is self-propelled and fully equipped to perform all of the operations of mowing, picking, chopping and loading the chopped hay.

Another important object of this invention is to provide a self-propelled low green crop harvesting machine which is equipped with a mower bar so mounted that it closely follows the contours of the ground over which the machine passes thus insuring that the crop will be uniformly mowed, all of the stalks being clipped at substantially the same distance above the ground and eliminating the wastage resulting from uneven or high cutting.

It is a more specific object of this invention to provide mounting means for a mower bar header for a low green crop harvesting machine which will so mount the header as to cause it to closely follow the contour of the ground.

It is yet another object of this invention to provide a mower bar header for a low green crop harvesting machine which rides the surface of the ground and is so mounted upon the machine that as the contour of the ground changes the mower bar header will rock upon a plurality of horizontal axes as it rides the surface of the ground in order to follow its changing contours.

More specific objects and advantages of this invention will be apparent from the following discussion and the description of the drawings in which:

Figure I is a front elevation of a low green crop harvesting machine embodying the invention.

Figure II is a side elevation of the machine shown in Figure I.

Figure III is a diagrammatic sketch in perspective illustrating the two planes of rocking motion provided for the mower bar header.

Figure IV is a diagrammatic sketch in elevation of the machine as shown in Figure II.

Figure V is an enlarged vertical longitudinal sectional view taken approximately on the center line of a mower bar header and the mounting means therefore, such as are employed on the machine shown in Figures I and II.

Figure VI is a fragmentary plan view of the crop mowing and handling mechanism illustrated in Figure V.

Figure VII is a fragmentary vertical sectional view taken substantially on the line VII—VII of Figure VI and showing a portion of the driving mechanism for operating the crop mowing and handling means which comprise part of the mechanism mounted upon the header of the machine.

Figure VIII is a vertical sectional view taken substantially from the position indicated by the line VIII—VIII of Figure V.

Figure IX is a fragmentary detailed sectional view taken on the line IX—IX of Figure VIII.

Figure X is a fragmentary detailed sectional view taken substantially on the line X—X of Figure IX.

Figure XI is an enlarged detailed fragmentary view illustrating the mounting means for a portion of the mowed crop handling equipment carried by the header illustrated in Figures V and VII.

A low green crop harvesting machine embodying the invention may have a main frame 1 which is constructed substantially in the form of open rectangle and which is equipped with four wheels, the front wheels 2 and the rear wheels 3. The rear wheels 3 are mounted upon a driving axle (not shown) which is connected through differential gearing to a drive shaft 4 (Figure II) and through a gear box 5 to a torque shaft 6 and a driving motor 7 mounted upon the frame 1. The motor 7 is used solely for propelling the machine. A second motor 8 also is carried on the machine and is used to drive all of the miscellaneous crops, mowing, handling and treating mechanisms which comprise the functional portions of the harvesting machine. This division of motive power is desirable because the crop handling mechanism is freed from any lag due to difficulties which the motor for motive power may encounter due to poor ground conditions etc. By dividing the load between the two motors each is enabled to operate at a selected speed. This also eliminates the necessity for complex clutches and speed selecting mechanisms which would be required if a single motor were used not only to move the machine but also to operate the functional mechanism carried on the machine.

The two front wheels 2 (Figures V and VIII) are mounted upon king pins (not shown) located at the extremities of the front axle 9 which is secured to the frame 1 of the machine by a mounting pin 10. The pin 10 extends horizontally through a pair of heavy plates 11 which are securely welded to a cross frame girder 12 constituting a member of the main frame 1. The front axle 9 is also provided with a pair of shock absorbers 13 and pairs of pads 14 in order to minimize the heavy shock to the frame of the machine when either of the front wheels 2 hits an obstruction of sufficient size to rock the axle into engagement with frame.

The mounting of the front axle upon a fore-and-aft mounting pin which is centrally located between the two front wheels gives the machine a stable three-point suspension. This provides for stability of the machine as a whole while still allowing a large amount of freedom to the individual wheels. A mounting providing for these two features is desirable because of the unevenness of the average field. The mounting disclosed is simple and relatively fool proof but has been found to be fully effective.

A considerable number of devices are mounted upon the main frame 1 of the machine. These include a chopper 15, a blower 16, a directional funnel 17 for the blower and the associated driving and transmission mechanisms by which power is transmitted from the motor 8 to these devices. The frame also carries an operator's seat 18, a steering wheel 19 and necessary controls 20 for the motors 7 and 8. All of this mechanism is conventional and therefore will not be described in detail. The chopper is located near the forward part of the body frame 1 and is provided with an entrance chute 21 (Figure V) at the bottom of which runs a canvas or similar belt 22 for carrying the mowed hay into the chopper. The chopper cuts the hay into short pieces three or four inches in length and delivers the chopped hay to the rotary high speed blower 16. The blower 16 blows the chopped hay out of the directional funnel 17 which is erected above the machine and supported by a crane-like brace 23 so that it can be swung either to the side or the rear of the harvesting machine. When mowing is taking place it is swung so that its open downwardly directed spout overlies a wagon, trailer or truck either running along side of or being towed by the harvesting machine. Because of the abundance of motive power provided by having a separate driving engine, the harvesting machine can pull trailers while it is mowing and harvesting a field. This eliminates the usual extra operator for towing the trailer or operating a truck.

The chute 21 leading to the chopper 15 is located at approximately the center of the front portion of the harvesting machine where it is in position to receive mowed hay that is discharged from an upwardly inclined loading chute 24 carried by a mower bar header 25 mounted on the front of the harvesting machine. The mower bar header 25 as a whole is so mounted upon the machine that it can be tilted around a transversely extending substantially horizontal axis as is illustrated in Figure IV. This motion is provided so that the mower bar header 25 can be raised substantially above ground level thereby permitting the machine to be run over highways and roads between fields and from its shed or central location to the fields which are to be mowed. Because of the separate driving motor 7 and because the wheels 2 and 3 preferably are equipped with dual purpose pneumatic tires, the machine is road worthy and will travel at speeds approximating 20 miles an hour without danger over normal roads. The three-point suspension of the running gear and the low center gravity of the machine resulting from the weights of the various crop handling devices make it easy to move under its own power from one location to the other.

The header mechanism 25 as a whole also is mounted for rocking motion around a substantially horizontal fore-and-aft axis. This motion is shown in Figure III and is provided so that the mower bar 42 itself will closely follow the contour of the fields which are being mowed.

The two rocking motions of the header 25 are achieved by erecting, at the front end of the frame 1, a vertically extending stationary frame which consists of the two heavy plates 11 already described as being welded to the boxed cross frame girder 12. The heavy plates 11 are further strengthened by additional girder like plates 26 which are welded to the girder 12 and to the plates 11 to form a rigid, very strong mounting frame. At the upper ends of the plates 11 and extending between them is a heavy rocking pin 27. This pin 27 extends through the two plates 11 substantially horizontally and fore-and-aft with respect to the machine as a whole, forming an axis for the rocking movement of the header 25. The pin 27 extends through a pair of bracing plates 28 which are welded to and form a part of a boxed girder 29 and forming with the girder 29, a rockable frame 30 which extends laterally across the front of the machine at the rear of the header 25. In each end of the boxed girder 29 there is welded a heavy horizontally extending pin 31. The pins 31 each extend through the upper ends of one of a pair of parallel header girders 32 which form the main frame for the header 25. All of the header mechanism is erected upon and supported by the two header girders 32.

The movement of the header shown in Figure IV, i. e., its raising and lowering or its rocking motion around the substantially horizontal transverse axis, is under the control of a pair of hydraulic cylinders 33. The cylinders 33 and their piston rods 34 are pivotally linked at their opposite ends to ears 35 welded to the front of the cross frame girder 12 and to similar ears 36 which are welded to braced pads 37 extending laterally from the sides of the header girders 32. When the pressure of the hydraulic fluid in the cylinders 33 is increased the pistons 34 are ejected from the cylinders swinging the header 25 upwardly around the axis formed by the two pins 31. Figures IX and X illustrate the universal joint structure by means of which the pistons 33 are pivotally secured to the ears 35 on the main frame. This structure comprises a transverse pin 38 extending through the ears 35 and carrying a second pin 39 having an axis perpendicular to that of the pin 38. The pin 39 extends through ears 40 on the cylinder 33, forming a universal joint.

The two header girders 32 extend downwardly and forwardly, their lower ends being turned horizontally to form supports for a heavy metal cross plate 41 which extends transversely across the front of the machine and serves as a mounting for a conventional mower bar 42 which is located at its front horizontal edge. The mower bar 42 will not be fully described because its construction is entirely conventional. It is supported relative to the ground by ground riding gear comprising shoes 43 formed at each end of the mower bar. A transversely extending green-crop reel 44 is mounted in journals 45 which are supported by arms 46 extending forwardly and upwardly from end plates 47 welded to the opposite edges of the cross plate 41. The green-crop reel 44, again, is a conventional structure, being provided with eccentric driving mechanism which maintains its tines 48 in the same position as the reel rotates. The tines swing inwardly (counterclockwise in Figure V) closely over the mower bar 42 sweeping the mowed hay upwardly over the surface of the cross plate 41 and backwardly into troughs 49 formed for feeding worms 50 and 51 or onto the front end of the elevating chute 24.

The two worms 50 and 51 are oppositely directed so that as the hay is thrown into their troughs by the reel 44, it is carried inwardly and dumped into the lower forward end of the chute 24. The chute 24 is composed of two side plates 52 which are welded to the header girders 32 along their lower edges and to the rear walls of the worm troughs 49 which are welded, in turn, to the end plates 47 and the heavy cross plate 41. The mowed hay is carried up the chute 24 by a drag consisting of a plurality of cross bars 53 extending between the links of two chains 54. The chains 54 run on two pairs of sprockets 55 and 56.

The sprockets 55 are mounted on opposite ends of a shaft 57 and the sprockets 56 are mounted upon opposite ends of the shaft 58. The shafts 57 and 58 are parallel and extend transversely across beneath a bottom plate 59 of the chute 24 which is welded to the two header girders 32.

It has been found that it is desirable not to have the two worms 50 and 51 mounted upon a single transverse shaft because this shaft would then extend across above the chute 24 and would become tangled and then snarled with the hay passing up the trough. It is found that if a rotating shaft extends through the area through which the hay is passing, great quantities of hay will invariably wrap around the shaft and eventually block the trough. For this reason the two worms 50 and 51 are not connected to each other, but are mounted solely in heavy outboard bearing structures 60 which are in turn mounted on the end plates 47.

The outboard bearing structures 60 are illustrated in Figure XI. Each of the worms 50 and 51 is built around a hollow hub 61 which is provided with a squared socket 62 for engagement with the squared end of a stub shaft 63. The worm is held upon the stub shaft 63 by a heavy set screw 64 threaded through the wall of the hub 61 and into the stub shaft 63. Each of the stub shafts 63 is rotatably journaled in a heavy bearing 65 and a smaller outboard bearing 66. The outboard bearing 66 is adjustably mounted in an eccentric end plate 67 located at the outer end of a flanged cup shaped housing 68 which is bolted or otherwise fixed upon the end plate 47. Located on the shaft 63 intermediate between the two bearings 65 and 66 is a drive sprocket 69 which is engaged with a drive chain 70 extending upwardly into the housing 68 through an opening 71 in the wall thereof. Because the worm 50 is mounted at only one end it is sometimes necessary to adjust its axial position in order to insure that it runs with clearance in its particular trough. Angular axial adjustment of the worm is accomplished by rotating the end plate 67 in the housing 68 which shifts the outboard bearing 66 transversely of the axis of the worm and swings the worm compensatingly to clear its flanges from the walls of the trough 49 in which it runs. This adjustment may be necessitated from time to time as the bearings wear or as the structure of the header shifts slightly due to stresses and strains thereon during operation. Although the single end mounting of a structure similar to a worm may not be as sound mechanically perhaps, as a double end mounting, the slight mechanical difficulty encountered is more than compensated for by the elimination of a bearing or a shaft extending over or through the chute 24 which would become choked and clogged with hay passing up the chute.

All of the mechanism mounted upon the header is driven from a shaft 72 which (Figure II) extends out of a transmission casing 73 shown as being located near the chopper 17 and driven by the motor 8. At the forward end of the shaft 72 is located a universal joint 74 which is connected to a downwardly and forwardly extending header drive shaft 75. The header drive shaft 75 incorporates a telescoping portion which permits the necessary shortening and elongation of the drive shaft 75 when the header is tilted around either of its axes. The lower end of the drive shaft 75 is connected to a universal joint 76 which is mounted upon the rear end of a short stub shaft 77 (see also Figure VI). The shaft 77 enters a small gear box 78 located beneath the heavy header cross plate 41. A transverse countershaft 79 (see also Figure V) extends out of the gear box 78 running across the full width of the header 25 beneath the header cross plate 41. Each end of the cross shaft 79 is journalled and carries a sprocket 80 with which is engaged one of the drive chains 70 which are engaged with the worm driving sprockets 69 on the worm stub shafts 63. Located at the left end (Figure VI) of the shaft 79 is a conventional wobble-plate 81 to which is connected an oscillating shaft 82 that extends downwardly and forwardly to the pitman or crank mechanism for driving the mower bar 42. At the right end (Figure VI) of the shaft 79 there is located another drive sprocket or V-belt pulley (not shown) which is engaged with a drive chain or belt 83 in turn engaged with a sprocket or pulley (not shown) on the end of the shaft of the green-crop reel 44. Figure VII illustrates the drive from the shaft 79 to the shaft 57 on which the sprockets 55 are mounted for driving the chains 54 which run up the trough 24. A pinion 84 is mounted upon the shaft 79 and is engaged with a second pinion 85 which is secured to a short stub shaft 86 parallel to the shaft 79. A sprocket (not shown) also is mounted on the shaft 86 and rotates with it, driving a short drive chain 87 which is engaged with a sprocket 88 on the shaft 57. The intermediate shaft 86 and pinions 84 and 85 are necessary in order to reverse the direction of the shaft 47 relative to the shaft 79. The shaft 79 rotates in a clockwise direction as shown in Figures V and VII driving the worms 50 and 51 in a clockwise direction in those figures and also rotating the green-crop reel in a clockwise direction.

The various driving mechanisms which have just been described may be entirely conventional inasmuch as the particular manner in which these devices, viz. the mower bar, green-crop reel, feeding worms and chain driven elevating mechanism running in the chute 24, are driven is not a part of the instant invention and therefore no detail of mechanism has been described.

As has been explained above, the header mechanism 25 as a whole rides upon the ground riding gear or shoes 43 which may be a part of the end plates 47 of the mower bar 42 or of other mechanism located at the forward portion of the header adjacent the ends of the mower bar 42. The structure shown in the drawings comprises heavy formed metal shoes 43 which are swung upwardly and back to act as guards for the ends of the mower bar and the green-crop reel as well as ground riding gear. Because the whole header mechanism is mounted upon the pin 27 for rocking movement on a fore-and-aft axis, as the ground contour changes and the shoes 43 follow the contour, the header tilts from side to side keeping the mower bar at a relatively fixed distance above the ground level. The weight of the forward end of the header acting around the pins 31 is, of course, very substantial and unless at least partly counterbalanced would cause the ground riding shoes 43 to dig into the surface of the earth creating a considerable resistance to the movement of the machine as a whole and perhaps even digging furrows through the field or hay possibly destroying plants. Not only might the results be bad insofar as the drag on the surface of the earth if the rod on the ground riding shoes were not at least partially supported elsewhere but the header mechanism would not "float" as effectively over the changing contour of the ground. There is provided mechanism for absorbing at least a considerable portion or perhaps more than the majority, of the weight of the header.

This mechanism consists in a pair of spring loaded thrust absorbing pistons 89 (Figure V) each of which is pivotally linked in a pair of ears 90 welded to a cross channel 91 extending between the two header girders 32. The opposite ends of the spring loaded thrust absorbing pistons 89 are connected to a pair of large braced ears 92 which extend forwardly from one of a pair of vertically braced plates 93 each of which is welded to and forms an integral part of the rockable frame 30 comprising the boxed girder and its strengthening plates 29. The lower rear surface of each of the plates 93, which extends along a vertical transverse plane, rests against a horizontal thrust receiving roller 94. Each of the rollers 94 is in turn rotatably mounted in a heavy pair of ears 95 welded to the main frame 1 and in particular to the boxed cross frame girder 12 thereof. The springs in the thrust absorbing cylinders 89 are of such strength that a majority of the weight of the forward part of the header is absorbed thereby, the thrust therefrom being transferred to the depending plates 93 and from them to the rollers 94 and the main frame 1 of the machine. Thus the entire header 25 is relatively free to rock on the fore-and-aft axis formed by the heavy mounting pin 28 and the weight of the header 25 is distributed between the ground riding shoes 43 and main frame 1 of the machine.

When it is desired to move the harvesting machine from one field to another or across a field when no mowing is taking place, the header 25 is raised by extending the hydraulic cylinders 33 and lifting the front end of the header 25 on the axis formed by the horizontally extending pins 31. At this point the entire weight of the header 25 is directly carried by the frame 1 of the machine and the header 25 does not rock laterally because each side is supported by one of the hydraulic cylinders 33 which are directly connected to the boxed cross frame member 12 of the main frame 1. When the machine is under way in this manner it is driven by its own driving motor 7 and the motor 8 is not operative. When it is desired to mow and chop a field of alfalfa, the hydraulic pressure is relieved and the header 25 is lowered until the ground riding gear engages the surface of the ground. No pressure remains in the hydraulic cylinders and the spring loaded thrust absorbing cylinders 89 come into play to absorb a considerable portion of the weight of the header. By means of the various controls 20 the operator can then engage the motor 8 through the various transmission mechanisms to oscillate the mower bar 42, rotate the green-crop reel 44, rotate the worms 50 and 51 and drive the chain elevator mechanism up the chute 24. The chopper 15 and blower 16 also are driven by the motor 8. As the machine traverses the field, the hay is mowed by the mower bar which closely follows the contour of the ground because of its universal pivotal mounting. This mows the crop at a fixed distance above the surface close enough so that no appreciable amount is lost. The mowed hay is swept either into the troughs 49 for the worms 50 and 51 or directly onto the lowermost ends of the loading chute 24. That portion of the crop that enters the trough 49 is carried inwardly by the worms 50 and 51 and dumped into the lower end of the chute 24. It is elevated therein by the chain lifting mechanism and spills over at the upper end of the chute 24 onto the belt 22 of the chopper 15. The hay is chopped into the chopper 15 and ejected into the blower 16 from which it is blown up through the directional funnel 17 and into whatever trailer or wagon may be pulled alongside of or behind the harvesting machine. One operator and one machine perform an operation which under previous systems required a separate mower and operator, rake and operator, windrow chopper and operator and a separate tractor or other source of motive power for each of these machines. Not only does the machine embodying the invention replace this multiplicity of machines but it also performs the mowing operation much more efficiently and productively than heretofore performed because of the rockable mounting of the mower header.

Numerous changes may be made, of course, in the conventional portions of the machine just described for this invention is concerned with the combination of elements set forth in the claims below by which the improved machine is achieved.

Having described the invention, I claim:

1. In a low crop harvesting machine, in combination, a body, a header comprising a forwardly extending frame, transversely extending crop mowing means mounted near ground level at the front of said frame, ground riding gear mounted on said frame adjacent said mowing means for supporting said mowing means at a selected distance above ground level, a mowed crop gathering reel mounted on said frame for sweeping the mowed crop away from said mowing means, means mounted on said frame behind and beneath said reel for moving the mowed crop laterally and accumulating the same at a certain location and crop elevating mechnism extending from such location for moving the mowed crop rearwardly and upwardly away from said header, a structure on the front of said body for mounting said frame for rocking motion about a substantially horizontal fore-and-aft axis and for mounting said frame for rocking motion about a transverse axis, means operatively extending between said frame and said body for supporting at least the majority of the weight of said header, and thrust absorbing means acting between said frame and said body substantially in line with said means for supporting the weight of said header.

2. A low crop harvesting machine comprising, a wheeled body, a frame mounted on the front end of the body for rocking motion on a substantially horizontal, fore-and-aft axis, a forwardly extending mower bar header mounted on said frame for rocking movement on a substantially horizontal transverse axis, a mower bar and ground riding gear located at the forward end of said header, said mower bar being mounted at a fixed level above said gear, means connected between said body and said header for lifting said header off the ground, resilient means acting between said header and said frame for absorbing at least the majority of the weight of said header thereby lessening the pressure of said ground riding gear on the ground, a mowed crop gathering reel mounted on said header with its axis parallel to said mower bar for sweeping the mowed crop rearwardly therefrom, crop elevating mechanism supported on said header and extending rearwardly from a point beneath and behind said gathering reel to a point on said body, transversely extending worms mounted on said header immediately beneath and behind said reel and extending inwardly to a point above the front of said crop elevating mechanism for moving the mowed crop inwardly and depositing the same on said elevating mechanism, means on said body for loading the treated crop into a container and power means carried by said body for operating said mower bar, said reel, said elevating mechanism, said worms and said loading means.

3. In a low crop harvesting machine having an inclined forwardly extending mower header comprising a transversely extending mower bar, ground riding gear for supporting said mower bar a selected distance above ground level and mowed crop gathering and moving means, mounting means for said header comprising, in combination, a stationary frame erected at the front of said machine; substantially horizontal, fore-and-aft axis pivotal mounting means secured to said frame, a rockable frame mounted on said pivoted mounting means and having depending arms; a pair of laterally extending pivotal mounts on said rockable frame, said header being mounted near its upper rear end on said mounts; spring loaded thrust absorbing struts extending between the lower portion of said depending arms and an intermediate portion of said header for supporting at least a considerable portion of the weight of said header thereby lessening the pressure of said ground riding gear on the ground and thrust rollers mounted between said stationary frame and said rockable frame; substantially in line with the frame end of said struts for transferring the thrust on said frame resulting from the support of said header by said struts to said machine, whereby said frame is free to rock on the first mentioned axis with the mower bar closely following the ground contour.

4. In a self-propelled harvesting machine for alfalfa and similar crops having a vehicle like body mounting crop treating mechanism, a mower bar header and mounting therefore comprising, in combination, a stationary frame erected at the front of said body, a substantially vertical rockable frame mounted on said stationary frame for rocking motion on a substantially horizontal fore-and-aft axis and having depending arms, structure mounted at the upper portion of said rockable frame forming a pivotal mounting means with a transverse axis for a mower bar header, a header pivotally mounted thereon and extending forwardly and downwardly when in mowing position, a transversely extending mower bar at the forward lower end of said header, ground riding gear located adjacent said mower bar for supporting said mower bar at a selected distance above ground level, mowed crop gathering means on said header for carrying the mowed crop up to the crop treating mechanism on said body, spring loaded thrust struts extending between the lower ends of said depending arms and an intermediate portion of said header and power means on said body for operating said mower bar, said crop gathering means and said crop treating mechanism.

5. A machine according to claim 4 in which the crop gathering means comprises a rotatable reel mounted on an axis extending parallel to and above said mower bar, a pair of oppositely directed worms mounted to rotate on an axis parallel to the axis of the reel, the worms being supported only at their outer ends, the inner ends being spaced axially, a trough extending fore-and-aft up the header from the space between the spaced inner ends of the worms up